United States Patent Office 2,955,950
Patented Oct. 11, 1960

---

2,955,950

CURING OF OXIDIZED DRYING OILS WITH ALUMINUM HYDROCARBON COMPOUNDS

John R. Lovett, Metuchen, Robert I. McDougall, Newark, and Merilyn T. Winters, Westfield, N.J., assignors to Esso Research and Engineering Company, a corporation of Delaware No Drawing. Filed Nov. 26, 1958, Ser. No. 776,421

12 Claims. (Cl. 106—285)

This invention relates to the curing of oxidized drying oils. It relates more particularly to the curing of thick films of such oils with aluminum organic compounds at ordinary or slightly elevated temperatures.

It is known to prepare films from liquid polymers of diolefins or copolymers of such diolefins with monomers copolymerizable therewith. These films have been cured by air drying or baking in an oven for about 30 minutes at about 150° C. to 175° C. However, it has not been possible to cure relatively thick films (more than 1.5 mils in thickness) of these oils with any degree of satisfaction.

Recently it has been found that resonably thick films (1.5 to 3 mils) can better be cured provided the oil is first oxidized to contain 10 to 20 wt. percent oxygen by blowing with the air or oxygen at a temperature between —7° and 138° C. in the presence of a solvent. However, such oils even in the presence of a drier require at least 5 days to air dry.

It has now been found that even thicker films can be cured in a very short time by admixing these oils with an aluminum hydrocarbon compound. At room temperatures or at slightly elevated temperatures, hard, chemically resistant coatings are obtained.

The oxidized drying oils to which the present invention is applicable include the hydrocarbon oily polymers of butadiene and copolymers of butadiene and styrene oils which have been oxidized to the indicated extent. Those oils containing other functional groups such as epoxy compounds can also be utilized. Data have shown that unoxidized oils do not work in the same manner.

The aluminum organic compounds that can be used include aluminum triethyl, aluminum diethyl hydride, aluminum triisobutyl or other aluminum alkyl compound of the formula RR'AlX. In this formula R, R' and X are alkyl groups preferably of 1 to 8 carbon atoms, although X may alternatively be hydrogen or a halogen, notably chlorine. Other similar group I-III metal derivatives can be employed.

The aluminum organic compound is usually utilized in an amount of 1 to 25 wt. percent based on resin solids. It is to be understood that throughout the present description all percentages are expressed on a weight basis unless otherwise specified. The aluminum compounds are conveniently utilized while in a solution with an inert solvent (generally hydrocarbon) such as toluene, xylene, benzene, heptane, etc. The aluminum compound concentration in the solvent is conveniently in the range of 1 to 50 wt. percent.

The preparation of the liquid polymers utilized is known and is no part of this invention, but will be stated for completeness. The oil, for example, is prepared by reacting 60 to 100 parts of butadiene and 40 to 0 parts of styrene in the presence of metallic sodium catalyst. Polymerization of the butadiene and styrene is carried out in a reaction diluent at temperatures from about 25° to 105° C. with about 0.5 to 5 parts of finely divided sodium per 100 parts of monomers used. The diluent used in the polymerization must boil between about —15° C. and 200° C., in amounts ranging from 100 to 500 parts per 100 parts of monomers. Preferred diluents are aliphatic hydrocarbons such as solvent naphtha or straight-run mineral spirits such as Varsol. In order to obtain a water-white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane-1,4 and diethyl ether. Finally, it is beneficial to use about 5 to 35 wt. percent (based on sodium) of an alcohol such as methanol, isopropanol, or an amyl alcohol in order to overcome the initial induction period. The resulting product may vary in viscosity from 0.15 to 20 poises (measured at 50% NVM in Varsol), and may be altered as desired for use in the curable liquid mix. The preparation of this oil is described in U.S. Patent 2,762,851 which is incorporated herein by reference.

It is preferable to utilize an oxidized oil. The blowing of the above polymeric drying oils with air or oxygen is best carried out in a solvent of moderate to good solvency, e.g. solvents or solvent mixtures having a kauri-butanol value of at least 40. At least a substantial portion of aromatic solvent is generally needed to secure such a KB value, and such aromatic content is highly beneficial in promoting oxygen uptake during the blowing treatment. It also aids materially in permitting high oxygen contents to be secured in the treatment without encountering the instability which induces gelation of the mass being treated. Other strong solvents, such as oxygenated solvents, have similar benefits. While mixtures of high and low KB value solvents are generally useful, the oil can be dissolved in strong solvents from the start, thereby eliminating low solvency solvents. The choice of solvents will, of course, depend on the oxygen content which is desired in the finished oil as well as on the formulations of the coating compositions which are to be made from the blown oil, and in the interest of economy it is generally desirable to use the cheapest solvents which possess the needed attributes of kauri-butanol value and compatibility with the various ingredients of the finished coating vehicle which is to be formulated.

Examples of suitable solvents include aromatic or mixtures of aromatic and aliphatic hydrocarbons boiling up to about 250° C. The aromatic solvent may be benzene, toluene, hemi-mellitene, pseudocumene, mesitylene, propyl benzene, cumene, ethyl toluene, methyl ethyl benzene, xylenes, Solvesso–100 (a mixture of aromatic hydrocarbons boiling from about 150° to 175° C.), Solvesso–150 (a mixture of aromatic hydrocarbons boiling from about 190° to 210° C.), or mixtures thereof. Other suitable solvents include the Varsols which are straight run mineral spirits boiling in the range of 140° to 205° C., having API gravities of 40 to 55 and varying in aromatic content from 5 to 35 wt. percent.

Catalysts suitable for the oxidation reaction of this invention include organic salts of metals such as the naphthenates, octoates, and other hydrocarbon soluble metal salts of cobalt, lead, iron, and manganese. These catalysts are used in amounts ranging from 0.001% to 1.0%. Peroxides such as benzoyl peroxide and the like may be added to reduce the induction period.

It is to be understood that conditions of temperature and time of reaction, ratio of reactants, degree of dilution, presence or lack of solvents and the like will depend upon factors including the degree of oxidation desired and the nature of the starting polymer, therefore, it is not intended that the invention be limited by the specific conditions and examples herein set forth as it is intended to illustrate and not limit the invention.

The nature of the oxidized diolefin polymer depends largely upon the extent of oxidation which in turn depends on various factors including time of oxidation, temperature, presence or absence of catalysts, type of solvent, etc. In general, greater extent of oxidation results in a lower solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is completely soluble only in aromatic solvents indicating that the oxidation has proceeded to a high degree. The percent of oxygen in the product will vary according to the conditions from a trace to 20% or more. For the purposes of this invention the oxidized oil should contain 10% to 20% oxygen.

In accordance with this invention, the oil is mixed with the aluminum alkyl in the quantity stated and applied to the desired surface. It is preferable to spray the materials, either premixed or blended in a catalytic spray gun, directly on to the surface. The two components can be applied at a temperature between 0° and 100° C., generally room temperature of 25° C., so as to produce a film of about 0.2 to 2.5 mils thick. The aluminum hydrocarbon compounds react instantaneously with the functional groups in the above described oils, thus effecting a very rapid crosslinking. The mixture is then air dried at room temperature or baked from 5 to 30 minutes at 60° C. to 150° C. The shorter the alkyl group of the aluminum organic compound, the more rapid the cure. The properties of the film obtained may be varied by varying the specific aluminum compound used or the curing conditions within the ranges stated. The rapid cures obtained enable the coatings to be used for pipelines, tank linings, wood finishes, glass laminates, pressed boards, impregnants, and other industrial finishes.

This invention and its advantages will be better understood by reference to the following examples.

EXAMPLE 1

Air blown oils of butadiene and styrene were applied to various surfaces employing various amounts of aluminum triethyl and none in the control. The conditions and the results are indicated in the table presented below.

*Table I*

| Oxygen Content | Percent $AlEt_3$ (based on butoxy solids) | Cure | Thickness (mils) | Sward Hardness | Water (5 hrs.) | Grease (2 hrs.) | Soap (2 hrs.) | 1% NaOH (1 hr.) |
|---|---|---|---|---|---|---|---|---|
| 14.7% $O_2$ | 2.7 | Air dry—1 day | 1.2 | 4 | | | | |
| 14.7% $O_2$ | 2.7 | 15' at 102° C | 1.7 | 12 | | | | |
| 14.7% $O_2$ | 2.7 | 30' at 102° C | 1.8 | 10 | | | | |
| 14.7% $O_2$ | 5.4 | Air dry—1 day | 2.2 | 4 | 2 | 0 | 0 | 0 |
| 14.7% $O_2$ | 5.4 | 15' at 102° C | 0.9 | 16 | 2 | 0 | 3 | 1 |
| 14.7% $O_2$ | 5.4 | 30' at 102° C | 1.9 | 12 | 0 | 1 | 0 | 0 |
| 14.7% $O_2$ | 10.9 | Air dry—1 day | 1.2 | 6 | | | | |
| 14.7% $O_2$ | 10.9 | 15' at 102° C | 1.2 | 14 | | | | |
| 14.7% $O_2$ | 10.9 | 30' at 102° C | 1.2 | 14 | | | | |
| 14.7% $O_2$ | 21.7 | Air dry—1 day | 1.4 | 10 | | | | |
| 14.7% $O_2$ | 21.7 | 15' at 102° C | 1.0 | 24 | | | | |
| 14.7% $O_2$ | 21.7 | 30' at 102° C | 1.7 | 14 | | | | |
| 14.7% $O_2$ | Control | Air dry—3 days | tacky | | | | | |
| 14.7% $O_2$ | Control | 15' at 102° C | tacky | | | | | |
| 14.7% $O_2$ | Control | 30' at 102° C | 0.95 | 12 | 3 | 0 | 0 | 1 |
| 10% $O_2$ | 8.1 | Air dry—1 day | 1.1 | 6 | | | | |
| 10% $O_2$ | 8.1 | 15' at 102° C | 1.1 | 8 | | | | |
| 10% $O_2$ | 8.1 | 30' at 102° C | 0.85 | 8 | | | | |
| 10% $O_2$ | 16.2 | Air dry—1 day | 1.0 | 12 | 0 | 1 | 0 | 0 |
| 10% $O_2$ | 16.2 | 15' at 102° C | 0.7 | 12 | 0 | 3 | 0 | 0 |
| 10% $O_2$ | 16.2 | 30' at 102° C | 0.5 | 14 | 0 | 3 | 0 | 0 |
| 10% $O_2$ | Control | Air dry—3 days | tacky | | | | | |
| 10% $O_2$ | Control | 15' at 102° C | tacky | | | | | |
| 10% $O_2$ | Control | 30' at 102° C | tacky | | | | | |

Ratings: 0 (unaffected); 1–3 (discolored and less adhesion); 4–6 (softened); 7–9 (failure by removal of film).

Sward hardness is a hardness measurement based on glass being 100.

The data demonstrate that satisfactory chemical resistance was obtained with either air drying or low temperature baking.

EXAMPLE 2

Additional formulations of the same resin as Example 1 but with different aluminum organic compounds were prepared and tested. The details are presented in Tables II and III.

*Table II*

ALUMINUM DIETHYL CHLORIDE AS A CURING AGENT WITH BUTOXY RESIN

| Type Butoxy | Percent Aluminum Diethyl Chloride (based on butoxy solids) | Cure, Time/Temp. | Thickness (mils) | Sward Hardness |
|---|---|---|---|---|
| 14.7% $O_2$ | 2.9 | 5' at 300° F | 3.0 | 12 |
| 14.7% $O_2$ | 2.9 | 15' at 225° F | 3.2 | 10 |
| 14.7% $O_2$ | 2.9 | Air dry—1 day | 3.0 | 2 |
| 14.7% $O_2$ | 8.6 | 5' at 300° F | 1.6 | 30 |
| 14.7% $O_2$ | 8.6 | 15' at 225° F | 1.5 | 24 |
| 14.7% $O_2$ | 8.6 | Air dry—1 day | 0.7 | 36 |
| 14.7% $O_2$ | 14.3 | 5' at 300° F | 5.5 | 14 |
| 14.7% $O_2$ | 14.3 | 15' at 225° F | 2.0 | 24 |
| 14.7% $O_2$ | 14.3 | Air dry—1 day | 5.5 | 2 |
| 14.7% $O_2$ | Control | 5' at 300° F | 2.0 | 8 |
| 14.7% $O_2$ | Control | 15' at 225° F | 1.5 | 10 |
| 14.7% $O_2$ | Control | Air dry—1 day | tacky | |
| 10% $O_2$ | 2.1 | 5' at 300° F | 1.3 | 14 |
| 10% $O_2$ | 2.1 | 15' at 225° F | 1.4 | 10 |
| 10% $O_2$ | 2.1 | Air dry—1 day | 1.3 | 8 |
| 10% $O_2$ | 6.3 | 5' at 300° F | 1.8 | 12 |
| 10% $O_2$ | 6.3 | 15' at 225° F | 1.0 | 16 |
| 10% $O_2$ | 6.3 | Air dry—1 day | 1.8 | 6 |
| 10% $O_2$ | Control | 5' at 300° F | 1.7 | 6 |
| 10% $O_2$ | Control | 15' at 225° F | tacky | |
| 10% $O_2$ | Control | Air dry—1 day | tacky | |

Table III

DI-ISOBUTYL ALUMINUM HYDRIDE AS A CURING AGENT WITH BUTOXY RESIN

| Type Butoxy | Percent Di-isobutyl Aluminum Hydride (based on butoxy solids) | Cure, Time/Temp. | Thickness (mils) | Sward Hardness |
|---|---|---|---|---|
| 18.8% $O_2$ | 1.4 | 10' at 300° F | 1.2 | 42 |
| 18.8% $O_2$ | 1.4 | 15' at 250° F | 1.6 | 30 |
| 18.8% $O_2$ | 1.4 | Air dry—1 day | 0.7 | 8 |
| 18.8% $O_2$ | 5.5 | 10' at 300° F | 0.7 | 28 |
| 18.8% $O_2$ | 5.5 | 15' at 250° F | 0.7 | 24 |
| 18.8% $O_2$ | 5.5 | Air dry—1 day | 0.4 | 22 |
| 18.8% $O_2$ | Control | 10' at 300° F | 2.0 | 14 |
| 18.8% $O_2$ | Control | 15' at 250° F | 1.8 | 10 |
| 18.8% $O_2$ | Control | Air dry—1 day | tacky | |
| 10% $O_2$ | 1.2 | 10' at 300° F | 0.8 | 14 |
| 10% $O_2$ | 1.2 | 15' at 250° F | 0.9 | 8 |
| 10% $O_2$ | 1.2 | Air dry—1 day | 0.7 | 6 |
| 10% $O_2$ | 14.8 | 10' at 300° F | 0.7 | 20 |
| 10% $O_2$ | 14.8 | 15' at 250° F | 0.5 | 20 |
| 10% $O_2$ | 14.8 | Air dry—1 day | 0.7 | 10 |
| 10% $O_2$ | Control | 10' at 300° F | 1.6 | 8 |
| 10% $O_2$ | Control | 15' at 250° F | tacky | |
| 10% $O_2$ | Control | Air dry—1 day | tacky | |

These data demonstrate the improved performance obtained according to the usage of this invention.

The advantages of this invention wil be apparent to those skilled in the art. Improvements in curing both in time and characteristics such as clarity and gloss are obtained in an efficient, economical manner. No corrosion problems are encountered.

It is to be understood that this invention is not limited to the specific examples which have been offered merely as illustrations and that modifications may be made without departing from the spirit of the invention.

What is claimed is:

1. A coating composition consisting essentially of an oxidized liquid polymer of from 60 to 100 parts of butadiene and from 40 to 0 parts of styrene, said oil having been oxidized to an oxygen content of from 10–20 wt. percent and an aluminum organic compound corresponding to the formula RR'AlX wherein R and R' are alkyl groups having 1 to 8 carbon atoms and X is selected from the group consisting of alkyl groups having 1 to 8 carbon atoms, hydrogen and halogen.

2. The composition of claim 1 in which the aluminum hydrocarbon compound is utilized in an amount of 1 to 25% based on oxidized liquid polymer.

3. The composition of claim 2 in which the aluminum organic compound is aluminum triethyl.

4. The composition of claim 2 in which the aluminum organic compound is aluminum diethyl chloride.

5. The composition of claim 2 in which the aluminum organic compound is diisobutyl aluminum hydride.

6. A process for improving the hardness of films prepared from an oxidized liquid polymer of from 60 to 100 parts of butadiene and from 40 to 0 parts of styrene, said oil having been oxidized to an oxygen content of from 10–20 wt. percent, which comprises admixing the oil with an aluminum organic compound corresponding to the formula RR'AlX wherein R and R' are alkyl groups having 1 to 8 carbon atoms and X is selected from the group consisting of alkyl groups having 1 to 8 carbon atoms, hydrogen and halogen, laying down a film of the resulting mixture and curing the film.

7. The process of claim 6 in which the amount of aluminum organic compound utilized is in the range of 1 to 25 wt. percent based on resin solids.

8. The process of claim 7 in which the aluminum organic compound is aluminum triethyl.

9. The process of claim 7 in which the aluminum organic compound is aluminum diethyl chloride.

10. The process of claim 7 in which the aluminum organic compound is diisobutyl aluminum hydride.

11. The process of claim 7 in which the film is cured by drying in air at about room temperature.

12. The process of claim 7 in which the film is cured by baking from 5 to 30 minutes at 60° to 150° C.

References Cited in the file of this patent

UNITED STATES PATENTS

| | | |
|---|---|---|
| 2,699,457 | Ziegler et al. | Jan. 11, 1955 |
| 2,835,685 | Rinse | May 20, 1958 |
| 2,856,300 | McKay | Oct. 14, 1958 |